June 23, 1931.  E. W. ZEH  1,810,996
SCREW POWER PRESS
Filed July 27, 1929  2 Sheets-Sheet 2
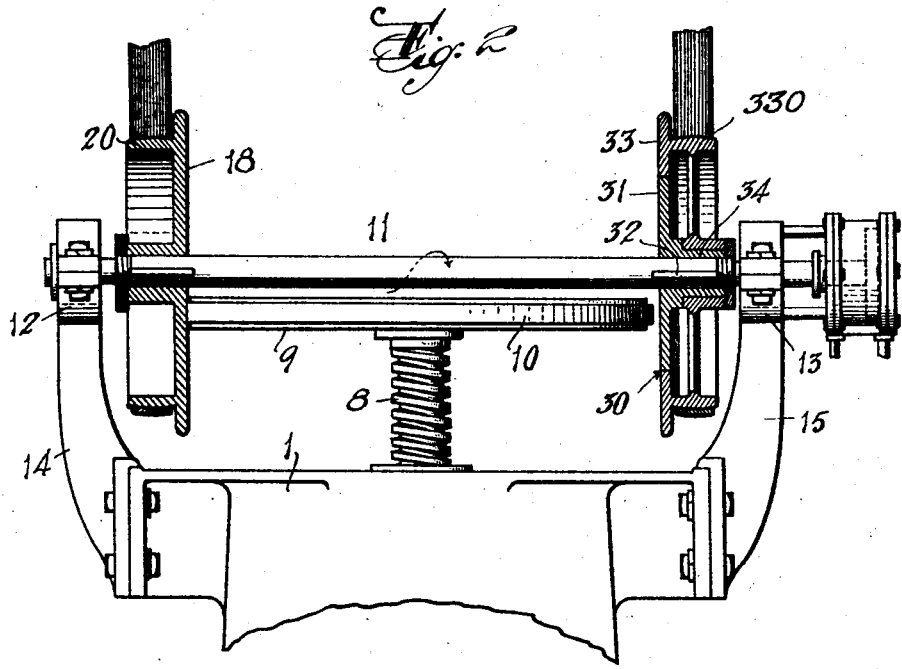
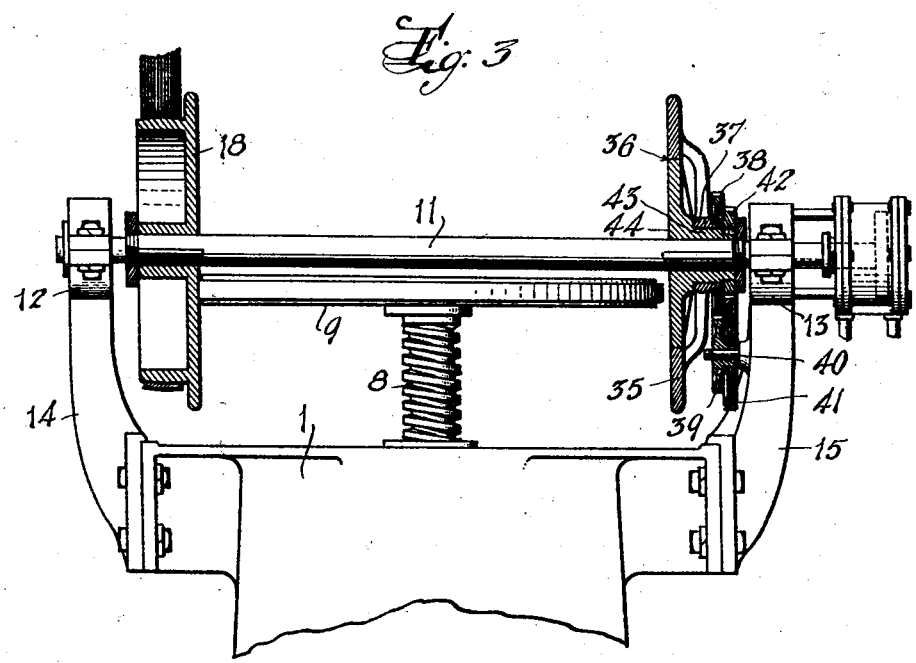
INVENTOR
Edmund H. Zeh,
BY
Everett H. Cook,
ATTORNEYS.

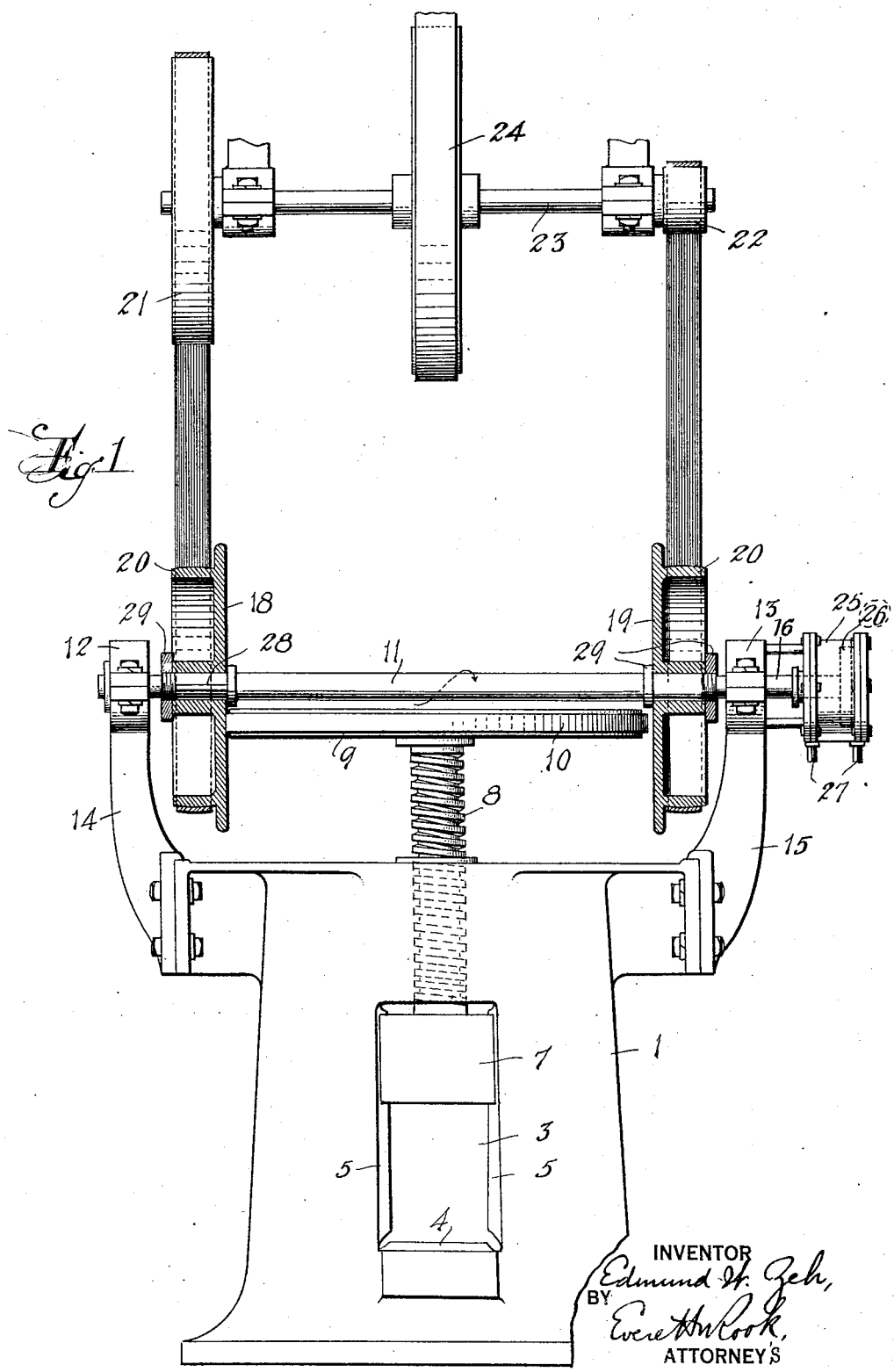

Patented June 23, 1931

1,810,996

UNITED STATES PATENT OFFICE

EDMUND W. ZEH, OF NEWARK, NEW JERSEY

SCREW POWER PRESS

Application filed July 27, 1929. Serial No. 381,658.

This invention relates in general to that class of power presses in which a head for carrying one die is moved toward and away from a bed supporting a fixed die by a screw which is alternately rotated in opposite directions by alternate engagement of a pair of friction discs with opposite sides of a friction wheel carried by the screw, the invention being more particularly directed to the driving of the friction drive discs and friction wheel.

Where the two drive discs rotate at the same speed, the friction wheel driving the screw is rotated with increasing velocity on the down or pressure producing stroke of the screw by movement of the point of contact of the friction wheel with the drive disc from the center of the drive disc with slow speed toward its periphery at increasing speed. This is quite desirable. On the return stroke the friction wheel starts at the periphery of the drive disc at high speed and travels at gradually decreasing speed. This is objectionable because, due to the mass and inertia of the friction wheel and the fact that the coefficient of friction is low at high speed, considerable loss of power and wear and tear on the friction surfaces are sustained, while efficiency of the press is lowered by slow pick-up and return of the friction wheel and the head operated thereby to starting position. This is true especially of large presses, where sometimes the friction drive disc fails to raise the friction wheel.

One object of my invention is to provide novel and improved means for overcoming the foregoing objections and at the same time retaining all of the advantages in presses of the character described.

Another object is to provide a power press of this character wherein said friction drive discs are so constructed and arranged that the friction wheel is driven on the down stroke of the screw as usual with gradually increasing speed, while on the upstroke said friction wheel is started at slow speed where the coefficient of friction is high so that the friction wheel is moved on the return stroke without difficulty.

Other objects are to provide such a power press wherein the "return-stroke" drive disc is rotated at lower speed than the "downstroke" disc; to provide a power press of the general character described in which the "return-stroke" drive disc is composed of two sections rotating at different speeds, with the section of lower speed to contact with the friction wheel for initiating the return stroke; to provide a return stroke drive disc comprising a circular body section concentric with the drive shaft and an annular concentric rim section with the faces of said sections in a common plane; to provide means for rotating said sections at different speeds; and to obtain other advantages and results as will be more fully brought out by the following description.

Referring to the accompanying drawings, in which like numerals of reference indicate the same parts throughout the several views, Figure 1 is a front elevation of a power press embodying my invention showing, the friction drive discs in transverse section.

Figure 2 is a similar view of a modified form of the invention, the power shaft being omitted, and Figure 3 is a like view of another form of the invention.

Specifically describing the embodiment of the invention illustrated by Figures 1 to 3, inclusive, the numeral 1 designates the frame of the press which is provided with an elongated vertically disposed opening 3 extending transversely through the frame at its longitudinal center, said openings being formed at the lower end thereof with a bed 4 adapted to receive a fixed die (not shown). The sides of the opening 3 are provided with vertical guides 5 upon and between which is mounted a vertically slidable head 7 adapted to carry another die (not shown) to cooperate with the fixed die. This head 7 is carried by the lower end of a vertical screw 8 which has a suitable swivel connection with the head and extends upwardly through the top of the frame 1, the upper end thereof being provided with a horizontally disposed wheel 9 having a friction surface 10 on its periphery. It is obvious, therefore, that rotation of the screw alternately in opposite directions will cause the head 7 to be moved up and down on the guides 5.

Arranged above the friction wheel 9 and diametrically thereof is a horizontally disposed drive shaft 11 journalled in the bearings 12 and 13 at the upper ends of upstanding brackets 14 and 15 secured to opposite sides of the frame 1. The bearings 12 and 13 are preferably anti-friction, and the shaft 11 is both rotatable and slidable therein, one end of the shaft projecting outwardly beyond one bearing, as indicated at 16. Mounted on the shaft 11 at diametrically opposite points on the edge of the friction wheel 9 is a pair of friction drive members such as discs 18 and 19, adapted to alternately engage the friction surface 10 of the wheel 9 to rotate the screw 8.

Any suitable means may be utilized for driving the discs 18 and 19, but as shown I may provide a pulley surface 20 on the outer side of each disc and connect said pulley surfaces to the respective driving pulleys 21 and 22, on a power shaft 23 to which power may be applied by a belt and pulley 24 from any suitable source. Assuming the shaft 11 to be rotating in the direction of the arrows on Figures 1 and 2, it will be obvious that as the friction disc 19 engages the wheel 9, the head 7 will be forced upwardly, while engagement of the disc 18 with the wheel 9 will move the head 7 downwardly. To acomplish the alternate engagement of the friction discs 18 and 19 with the friction wheel 9 the shaft 11 is slidable in its bearings. For the purpose of longitudinally sliding the shaft 11 any suitable mechanism may be utilized, for example, the mechanism described in my Patent No. 1,324,095, dated December 9, 1919, or I may use a fluid pressure device comprising a cylinder 25 secured to the frame of the press and within which is reciprocable a piston 26 connected to the shaft 11. Fluid pressure may be alternately supplied to and vented from opposite sides of the piston 26 through pipes 27 by any suitable valve device (not shown).

In accordance with the invention the two discs 18 and 19 are to be rotated at different speeds, the disc 19 for driving the friction wheel 9 on the up-stroke of the screw 8 being rotated at a lower speed than the disc 18 for actuating the screw 8 on the down-stroke. For this purpose, the "down-stroke" drive disc 18 may be keyed or otherwise rigidly secured to the shaft 11 as at 28, while the disc 19 is rotatable relatively to the shaft. The respective driving pulleys 21 and 22 are of such relative sizes to the corresponding discs 18 and 19 as to drive the disc 18 at a higher speed than the disc 19. Both discs 18 and 19 are held against longitudinal movement on the shaft by the collars 29. With this construction it will be observed that the friction wheel 9 and screw 8 will be driven on the down-stroke with a gradually increasing velocity until the point of contact of the friction wheel with the disc 18 approaches the outer periphery of the disc. The shaft 11 is then shifted to cause contact of the disc 19 with the friction wheel to raise the screw 8. On the return-stroke of the screw and friction wheel, the initial movement of the friction wheel will take place at a relatively low speed at which the coefficient of the friction is much higher than at the speed of the disc 18 and friction wheel 9 at the end of the down-stroke. Loss of power and wear and tear on friction surfaces of the disc 19 and friction wheel are thus avoided and the friction wheel is raised without difficulty at a gradually decreasing speed.

In the form of the invention shown in Figure 2 the connection of the friction drive disc 18 to the shaft 11 and its connection to the drive pulley 21 are identical to that shown in Figure 1 of the drawings. The other drive disc 30 is of different construction and comprises a central body portion or section 31 keyed at 32 upon the shaft 11 and surrounded by a coaxial annular rim section 33 which is rotatable upon the hub portion 34 of the central section 31. The rim section 33 has connected therewith a pulley surface 330 which is connected by a belt to the drive pulley 22 as is the drive disc 19 of Figure 1.

With this construction it will be observed that the central section 31 of the drive disc 30 is rotated at the same speed as the drive disc 18, while the annular rim section 33 of the drive disc 30 is rotated at a lower speed. Therefore, the friction wheel 9 and screw 8 are actuated on their down-stroke with gradually increasing speed, as in the construction shown in Figure 1. The initial movement of the friction wheel on the return stroke is effected by the annular rim 33 rotating at a lower speed. As the friction wheel rises it passes from the rim section 33 into contact with the outer portion of the central section 31 where the speed of the wheel is increased and then gradually decreased as the point of contact of the friction wheel with the central section 31 approaches the center of the latter. It will be observed that the friction surfaces of the two sections 31 and 33 are in the same plane transversely to the axis of the shaft 11, and only enough clearance is provided between the edge of the central section and the inner periphery of the rim section to permit relative rotation of the sections.

The shaft 11 may be longitudinally moved to cause alternate engagement of the discs 18 and 30 with the friction wheel 9, by the same means described in connection with Figure 1.

In Figure 3 of the drawings is shown another form of the invention which is in general identical with that shown in Figure 2 the only difference being in the manner of driving the rim section 35 of the drive disc 36. In this form of the invention, the rim section 35 is provided with a hub 37 to which is keyed a gear 38 which meshes with a pinion 39 journaled on a stud shaft 40 on the arm 15 of the press frame. The pinion 39 is rigidly connected to a pinion 41 which in turn meshes with a gear 42 keyed to the hub 43 of the central section 44.

With this construction it will be observed that power from the shaft 11 will be transmitted through the gear 42, pinions 41 and 39 to the gear 38 so as to rotate the rim section 35. The ratio of the gearing is such as to rotate the rim section 35 at a lower speed than the central section 44, just as the rim section 33 is rotated at a lower speed than the central section 31 in the construction shown in Figure 2 of the drawings. The operation of this form of the invention is otherwise identical with that shown in Figure 2.

While I have shown and described the invention as embodied in certain details of construction, it should be understood that this is primarily for the purpose of illustrating the principles of the invention and that the details of construction may be widely modified and changed by those skilled in the art without departing from the spirit or scope of the invention.

Having thus described my invention, what I claim is:

1. In a power press, the combination with a frame, a screw mounted in said frame, a head on one end of said screw and a friction wheel on the other end, of coaxial friction drive members at opposite points on the edge of said friction wheel, means for rotating said drive members at different speeds, and means for causing alternate engagement of said friction drive members with said friction wheel.

2. In a power press, the combination with a frame, a screw mounted in said frame, a head on one end of said screw and a friction wheel on the other end, of coaxial friction drive members at opposite points on the edge of said friction wheel, a shaft rotatably movable in said frame for supporting said members, one of said members being rigidly secured upon said shaft and the other member being rotatable relatively to said shaft, means for rotating said shaft to drive one of said drive members, means for rotating the second-mentioned friction drive member at a different speed, and means for causing alternate engagement of said friction drive members with said friction wheel.

3. In a power press, the combination with a frame, a screw mounted in said frame, a head on one end of said screw and a friction wheel on the other end, of a shaft in said frame parallel to the plane of said friction wheel, friction drive members mounted on said shaft at opposite points on the edge of said friction wheel, means for rotating said drive members at different speeds, and means for causing alternate engagement of said frictional drive members with said friction wheel.

4. In a power press, the combination with a frame, a screw mounted in said frame, a head on one end of said screw and a friction wheel on the other end, of a shaft rotatable and longitudinally movably mounted in said frame parallel to the plane of said friction wheel, friction drive members mounted on said shaft against movement longitudinally of the shaft at opposite points on the edge of said friction wheel, means for rotating said friction drive members at different speeds, and means for longitudinally moving said shaft for causing alternate engagement of said friction drive members with said friction wheel.

5. In a power press, the combination with a frame, a screw mounted in said frame, a head on one end of said screw and a friction wheel on the other end, of a shaft rotatable and longitudinally movably mounted in said frame parallel to the plane of said friction wheel, friction drive members mounted on said shaft against movement longitudinally of the shaft at opposite points on the edge of said friction wheel, said friction drive members being respectively rotatable with and relatively to said shaft, means for rotating said shaft to drive one of said drive members, means for rotating the other drive member at a different speed, and means for longitudinally moving said shaft for causing alternate engagement of said friction drive members with said friction wheel.

6. In a power press, the combination with a frame, a screw mounted in said frame, a head on one end of said screw and a friction wheel on the other end, of a pair of friction drive members at opposite points on the edge of said friction wheel, one of said members comprising a central body section and an annular concentric rim section, means for rotating said sections of the first-mentioned drive member at different speeds, means for rotating the other drive member, and means for causing alternate engagement of said drive members with said friction wheel.

7. In a power press, the combination with a frame, a screw mounted in said frame, a head on one end of said screw and a friction wheel on the other end, of a pair of friction drive members at opposite points on the edge of said friction wheel, one of said members comprising a central body section and an annular concentric rim section, means for rotating the other drive member, means for rotating the central body section of the first-mentioned drive member at the same speed, means for rotating the rim section of the first mentioned member at another speed, and means for causing alternate engagement of said drive members with said friction wheel.

8. In a power press, the combination with a frame, a screw mounted in said frame, a head on one end of said screw and a friction wheel on the other end, of a pair of friction drive members at opposite points on the edge of said friction wheel, one of said members comprising a central body section and an annular concentric rim section, a shaft rotatable in said frame, the other drive member and the central section of the first-mentioned drive member being rigidly mounted on said shaft and the rim section of said first-mentioned drive member being rotatable relatively to said shaft, means for rotating said shaft, means for rotating the rim section of the first-mentioned drive member at a different speed, and means for causing alternate engagement of said drive members with said friction wheel.

9. In a power press, the combination with a frame, a screw mounted in said frame, a head on one end of said friction drive members at opposite points on the edge of said friction wheel, one of said members comprising a central body section and an annular concentric rim section, a shaft longitudinally movable and rotatable in said frame, the other drive member and the central section of the first-mentioned drive member being rigidly mounted on said shaft and the rim section of said first-mentioned drive member being rotatable relatively to and held against longitudinal movement on said shaft, means for rotating said shaft, means for rotating the rim section of the first-mentioned drive member at a different speed, and means for longitudinally moving said shaft to cause alternate engagement of said drive members with said friction wheel.

10. In a power press, the combination with a frame, a screw mounted in said frame, a head on one end of said screw and a friction wheel on the other end, of a pair of friction drive discs rotatable at opposite points on the edge of said friction wheel, one of said discs comprising a central body section and a relatively rotatably coaxial annular rim section having their friction surfaces in a common plane transverse to their axis, means for rotating said sections of the first-mentioned drive disc at different speeds, means for rotating the other drive disc, and means for causing alternate engagement of said drive discs with said friction wheel.

11. In a power press, the combination with a frame, a screw mounted in said frame, a tion drive members at opposite points on the tion wheel on the other end, of coaxial friction drive members at opposite points on the edge of said friction wheel to drive said friction wheel on its working stroke and its return stroke respectively, means for rotating said drive members in the same direction and the return stroke drive member at a lower speed than the other drive member, and means for causing alternate engagement of said friction drive members with said friction wheel.

EDMUND W. ZEH.